(12) United States Patent
Sato

(10) Patent No.: US 11,440,770 B2
(45) Date of Patent: Sep. 13, 2022

(54) ELEVATOR DERAILMENT DETECTION DEVICE

(71) Applicant: MITSUBISHI ELECTRIC CORPORATION, Chiyoda-ku (JP)

(72) Inventor: Shinichi Sato, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 1001 days.

(21) Appl. No.: 16/081,297

(22) PCT Filed: Apr. 18, 2016

(86) PCT No.: PCT/JP2016/062272
§ 371 (c)(1),
(2) Date: Aug. 30, 2018

(87) PCT Pub. No.: WO2017/183084
PCT Pub. Date: Oct. 26, 2017

(65) Prior Publication Data
US 2019/0039860 A1    Feb. 7, 2019

(51) Int. Cl.
*B66B 5/00* (2006.01)
*B66B 5/02* (2006.01)
*G01D 5/14* (2006.01)

(52) U.S. Cl.
CPC .......... *B66B 5/0031* (2013.01); *B66B 5/0025* (2013.01); *B66B 5/02* (2013.01); *G01D 5/14* (2013.01)

(58) Field of Classification Search
CPC .......... B66B 5/00; B66B 5/02; B66B 5/0006; B66B 5/0018–0037; B66B 7/02; B66B 7/044
See application file for complete search history.

(56) References Cited

FOREIGN PATENT DOCUMENTS

| JP | 9-301650 A | 11/1997 | |
|---|---|---|---|
| JP | 2007008675 A | * 1/2007 | .......... B66B 19/002 |
| JP | 2009-51604 A | 3/2009 | |
| WO | WO 2011/010376 A1 | 1/2011 | |

OTHER PUBLICATIONS

International Search Report dated Jul. 19, 2016, in PCT/JP2016/062272 filed Apr. 18, 2016.

* cited by examiner

*Primary Examiner* — Christopher Uhlir
(74) *Attorney, Agent, or Firm* — Oblon, McClelland, Maier & Neustadt, L.L.P.

(57) ABSTRACT

Provided is an elevator derailment detection device configured to detect disengagement of a vertically movable body to be guided by guide rails to be raised and lowered from at least one of the guide rails. The elevator derailment detection device includes: a conductive wire, which is provided in a hoistway in parallel to a direction in which the vertically movable body is raised and lowered; a magnetic field measurement device, which is provided to the vertically movable body so as to measure an intensity of a magnetic field generated by a current flowing through the conductive wire, and is configured to output the measured magnetic field intensity; and a controller configured to detect the disengagement of the vertically movable body from the at least one of the guide rails when the magnetic field intensity output from the magnetic field measurement device falls above or lower than an allowable range.

7 Claims, 2 Drawing Sheets

FIG. 2
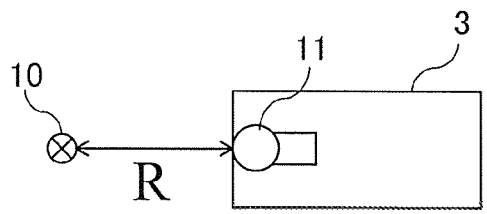
FIG. 3
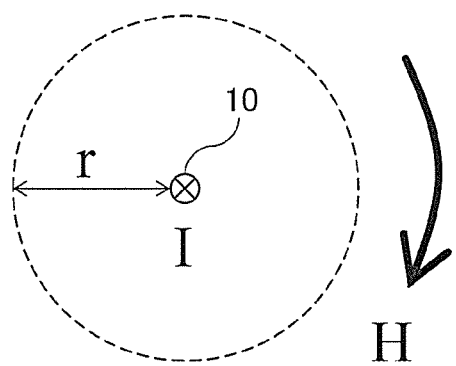
MAGNETIC FIELD INTENSITY $H = I / 2\pi r$ [A/m]
FIG. 4
| STATE | | CURRENT I[A] | MAGNETIC FIELD INTENSITY H[A/m] |
|---|---|---|---|
| NORMAL STATE | $r = R$ | $I = I_0$ | $H = I_0 / 2\pi R$ |
| DERAILMENT STATE | $0 < r < R$ | $I = I_0$ | $H > I_0 / 2\pi R$ |
| | $r > R$ | $I = I_0$ | $0 < H < I_0 / 2\pi R$ |
| CONDUCTIVE WIRE BREAKING STATE, OR POWER SUPPLY SHUT-OFF STATE | | $I = 0$ | $H = 0$ |

ELEVATOR DERAILMENT DETECTION DEVICE

TECHNICAL FIELD

The present invention relates to aa elevator derailment detection device, which is configured to detect disengagement of a vertically movable body, which is to be guided by guide rails to be raised and lowered, from at least one of the guide rails.

BACKGROUND ART

Hitherto, various technologies have been proposed as a technology for detecting a derailment of a vertically movable body such as a counterweight or a car (see, for example, Patent Literatures 1 to 4).

A derailment detection device described in Patent Literature 1 includes a first conductive wire set at a positive potential and a second conductive wire set at a ground potential, which are provided in parallel to guide rails, a first contact element through which the first conductive wire is caused to pass, and a second contact element through which the second conductive wire is caused to pass. Each of the first contact element and the second contact element is annular and provided to a vertically movable body. When a derailment of the vertically movable body occurs, the first conductive wire and the first contact element come into contact with each other, while the second conductive wire and the second contact element come into contact with each other. The configuration described above has a mechanism for detecting the derailment of the vertically movable body based on conduction and non-conduction between the first conductive wire and the first contact element.

CITATION LIST

Patent Literature

[PTL 1] WO 2011/010376 A1
[PTL 2] JP 2009-51604 A
[PTL 3] JP 9-301650 A
[PTL 4] JP 2003-321169 A

SUMMARY OF INVENTION

Technical Problem

According to the related art described in Patent Literature 1, a contact resistance between the conductive wire and the contact element sometimes becomes high. When the contact resistance becomes high, the conduction and the non-conduction between the first conductive wire and the first contact element cannot be precisely detected. As a result, there is a possibility that the derailment ox the vertically movable body cannot be detected. Further, when the conductive wire and the contact element come into contact with each other while the vertically movable body is being raised or lowered, there is a possibility that the contact element is bounced by the conductive wire due to, for example, shock of the contact, resulting in a failure to achieve reliable detection of the derailment of the vertically movable body.

As described above, there is a possibility that stability in the detection of the derailment of the vertically movable body may be impaired with the configuration of detecting the derailment of the vertically movable body based on the contact between the conductive wire and the contact element.

The present invention has been made to solve the problem described above, and has an object to provide an elevator derailment detection device capable of improving stability in detection of a derailment of a vertically movable body.

Solution to Problem

According to one embodiment of the present invention, there is provided an elevator derailment detection device, which is configured to detect disengagement of a vertically movable body, which is to be guided by guide rails to be raised and lowered, from at least one of the guide rails, the elevator derailment detection device including: a conductive wire, which is provided in a hoistway in parallel to a direction in which the vertically movable body is to be raised and lowered; a magnetic field measurement device, which is provided to the vertically movable body so as to measure an intensity of a magnetic field generated by a current flowing through the conductive wire, and is configured to output the measured magnetic field intensity; and a controller configured to detect the disengagement of the vertically movable body from the at least one of the guide rails when the magnetic field intensity output from the magnetic field measurement device falls above or lower than an allowable range.

Advantageous Effects of Invention

According to one embodiment of the present invention, it is possible to provide the elevator derailment detection device capable of improving stability in detection of the derailment of the vertically movable body.

BRIEF DESCRIPTION OF DRAWINGS

FIG. 2 is an explanatory diagram for illustrating a set interval between a conductive wire and a magnetic field measurement device of FIG. 1.

FIG. 3 is an explanatory diagram for illustrating an intensity of a magnetic field generated by a current flowing through the conductive wire of FIG. 1.

FIG. 4 is a table for showing a relationship between the magnetic field intensity of FIG. 3 and various states.

DESCRIPTION OF EMBODIMENT

Figure 1:
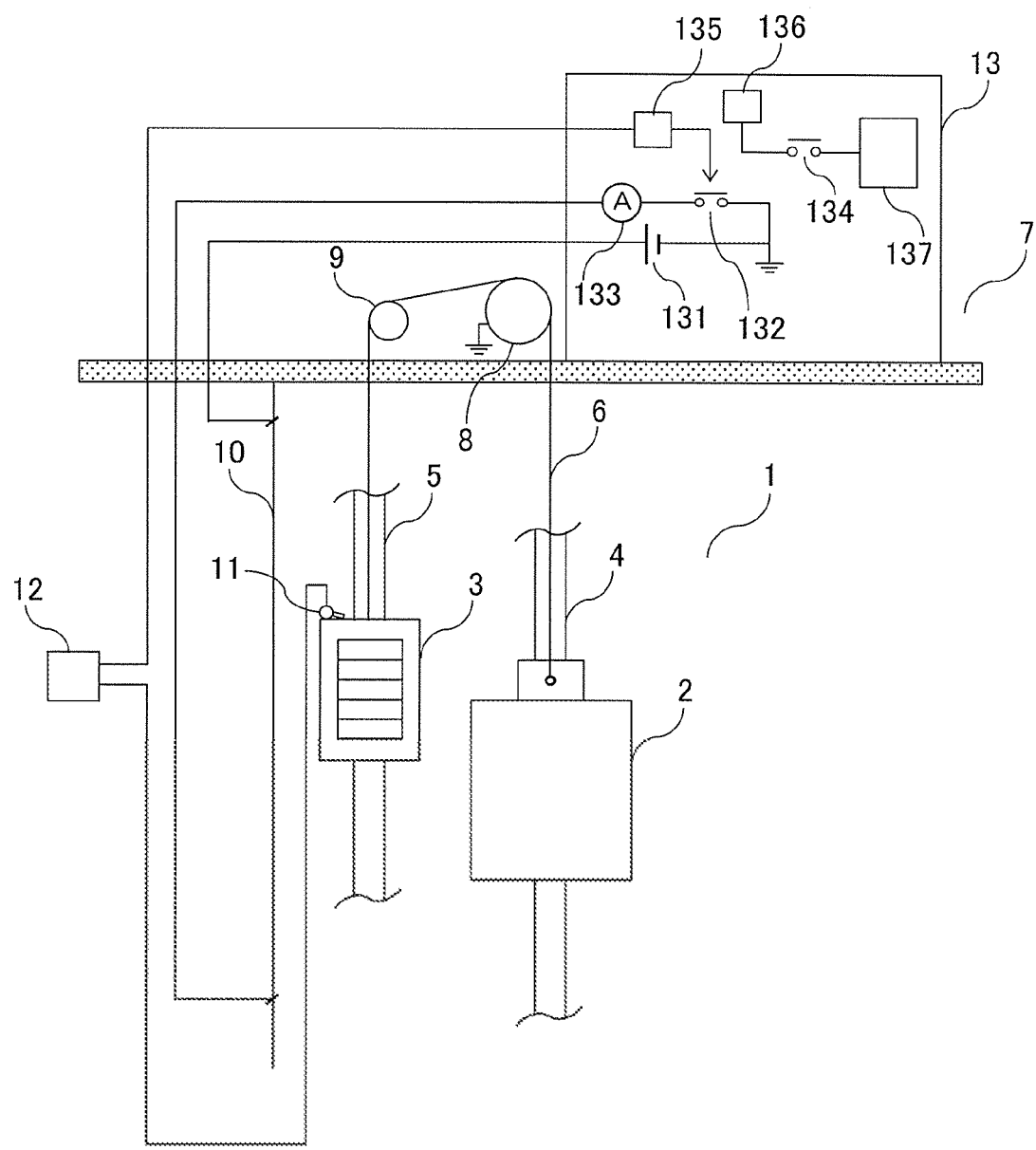
FIG. 1 is an overall configuration diagram for illustrating an example of an elevator apparatus to which an elevator derailment detection device according to a first embodiment of the present invention is applied.

Referring to the accompanying drawings, an elevator derailment detection device according to an exemplary embodiment of the present invention is described below. In the description of the drawings, the same elements are denoted by the same reference symbols, and a redundant description is omitted.

First Embodiment

FIG. 1 is an overall configuration diagram for illustrating an example of an elevator apparatus to which an elevator derailment detection device according to a first embodiment of the present invention is applied. FIG. 2 is an explanatory diagram for illustrating a set interval R between a conductive wire 10 and a magnetic field measurement device 11 of FIG. 1.

In FIG. 1, a car 2 and a counterweight 3 are provided in a hoistway 1 so that the car 2 and the counterweight 3 can be raised and lowered. In the hoistway 1, a pair of car guide rails 4, which is configured to guide the raising and lowering of the car 2, and a pair of counterweight guide rails 5, which is configured to guide the raising and lowering of the counterweight 3, are provided.

The pair of car guide rails 4 is provided vertically upright so that the car guide rails 4 are opposed to each other. Similarly, the pair of counterweight guide rails 5 is provided vertically upright so that the counterweight guide rails 5 are opposed to each other.

The car 2 and the counterweight 3 are suspended by a main rope 6 inside the hoistway 1. For example, a rope or a belt is used as the main rope 6. The main rope 6 is looped over a hoisting machine 8 and a deflector sheave 9, which are provided in a machine room 7. The hoisting machine 8 generates a driving force for raising and lowering the car 2 and the counterweight 3 in accordance with a control command output from an elevator control board (not shown) provided in the machine room 7.

The elevator derailment detection device (hereinafter abbreviated as "derailment detection device") detects a derailment of the counterweight 3, specifically, a state in which the counterweight 3 is disengaged from the counterweight guide rail 5. The derailment detection device includes a conductive wire 10, a magnetic field measurement device 11, a noise attenuator 12, and a controller 13.

The conductive wire 10 is provided in parallel to a direction in which the counterweight 3 is raised and lowered, specifically, vertically inside the hoistway 1. The conductive wire 10 is placed to extend from a ceiling to a bottom surface of the hoistway 1. Further, for example, a wire having conductivity can be used to construct the conductive wire 10.

The magnetic field measurement device 11 measures an intensity of a magnetic field generated by a current flowing through the conductive wire 10 and outputs the magnetic field intensity. For example, a teslameter can be used to construct the magnetic field measurement device 11.

The magnetic field measurement device 11 is provided to the counterweight 3 so as to measure the intensity of the magnetic field generated by the current flowing through the conductive wire 10. More specifically, the magnetic field measurement device 11 is provided to a top of the counterweight 3 so that an interval from the conductive wire 10 becomes equal to a set interval R that is set in advance. In a configuration in which the magnetic field measurement device 11 is provided to the top of the counterweight 3, an interval between the counterweight 10 and the magnetic field measurement device 11 at a time when the counterweight 3 is viewed from above becomes the set interval R, as illustrated in FIG. 2.

When the counterweight 3 is raised and lowered under a state in which the counterweight 3 is not disengaged from the counterweight guide rail 5, the interval between the conductive wire 10 and the magnetic field measurement device 11 is maintained to the set interval R irrespective of the position of the counterweight 3. Meanwhile, under the state in which the counterweight 3 is disengaged from the counterweight guide rail 5, the interval between the conductive wire 10 and the magnetic field measurement device 11 is not maintained to the set interval R, and a value of the interval changes from the set interval R.

In the configuration described above, when the magnetic field measurement device 11 measures the magnetic field intensity, the counterweight 3 and the conductive wire 10 do not physically come into contact with each other. Therefore, there is no effect of a failure of the measurement of the magnetic field intensity, which may be caused by aging degradation of, for example, the counterweight 3 or the conductive wire 10, and hence the magnetic field intensity can be measured in a stable manner.

Further, in contrast to the related art described in Patent Literature 1, a contact element, which is provided to come into contact with the conductive wire when a derailment of a vertically movable body occurs, is not required. Therefore, under any situations, the detection of the derailment of the vertically movable body is not prevented due to a contact resistance and shock of the contact generated when the contact element and the conductive wire come into contact with each other.

The noise attenuator 12 attenuates noise superimposed on the magnetic field intensity output from the magnetic field measurement device 11 and outputs the magnetic field intensity after the attenuation of noise to the controller 13. For example, a bandpass filter for removal of the noise can be used to construct the noise attenuator 12.

Although the derailment detection device is not necessarily required to include the noise attenuator 12, it is preferred that the derailment detection device include the noise attenuator 12 in view of noise generated by various devices provided in the hoistway 1. With the noise attenuator 12, even when the noise generated by various devices provided in the hoistway 1 is superimposed on the magnetic field intensity, a more accurate magnetic field intensity can be output to the controller 13.

When the magnetic field intensity output from the magnetic field measurement device 11 falls above or lower than a preset allowable range, the controller 13 detects the disengagement of the counterweight 3 from the counterweight guide rail 5. The controller 13 is configured, for example, to be built into the elevator control board provided in the machine room 7.

More specifically, the controller 13 includes a DC power supply 131, a switch 132, a relay including a relay coil 133 and a relay switch 134, a determinator 135, a normal-signal output device 136, and a detector 137. The determinator 135 and the detector 137 are implemented by, for example, a CPU configured to execute a program stored in a storage device such as a memory, and a processing circuit such as a system LSI.

A specific internal configuration of the controller 13 described herein is merely an example. The controller 13 may have any internal configuration as long as the derailment of the counterweight 3 can be detected when the magnetic field intensity output from the magnetic field measurement device 11 falls above or lower than the allowable range.

When the switch 132 is ON, the DC power supply 131 allows a current to flow through the conductive wire 10 and the relay coil 133. Meanwhile, when the switch 132 is OFF, the DC power supply 131 does not allow the current to flow through the conductive wire 10 and the relay coil 133.

The relay switch 134 is ON when the current is flowing through the relay coil 133 and is OFF when the current is not flowing through the relay coil 133.

The determinator 135 determines whether or not the magnetic field intensity output from the magnetic field measurement device 11 falls within the allowable range. The determinator 135 maintains the ON state of the switch 132 when the magnetic field intensity output from the magnetic field measurement device 11 falls within the allowable range and turns the switch 132 from ON to OFF when the magnetic field intensity fails above or lower than the allowable range.

When the relay switch 134 is ON, the normal-signal output device 136 outputs a normal signal to the detector 137. Meanwhile, when the relay switch 134 is OFF, the normal-signal output device 136 does not output the normal signal to the detector 137. As described above, when the magnetic field intensity falls above or lower than the allowable range, the determinator 135 interrupts the input of the normal signal from the normal-signal output device 136 to the detector 137.

The detector 137 does not detect the derailment of the counterweight 3 when the normal signal is input from the normal-signal output device 136 and detects the derailment of the counterweight 3 when the normal signal is not input from the normal-signal output device 136. As described above, when the input of the normal signal from the normal-signal output device 136 is interrupted, the detector 137 detects the disengagement of the counterweight 3 from the counterweight guide rail 5.

In the configuration described above, when the switch 132 is turned OFF by the determinator 135, the input of the current from the DC power supply 131 to the relay coil 133 is stopped. Along with the stop of the input of the current, the relay switch 134 is turned OFF. When the switch 134 is turned OFF, the input of the normal signal from the normal-signal output device 136 to the detector 137 is stopped. Along with the stop of the input of the normal signal, the detector 137 detects the derailment of the counterweight 3.

Next, an operation of the controller 13 is further described with reference to FIG. 3 and FIG. 4. FIG. 3 is an explanatory diagram for illustrating an intensity H of a magnetic field generated by a current I flowing through the conductive wire 10 of FIG. 1. FIG. 4 is a table for showing a relationship between the magnetic field intensity H of FIG. 3 and various states.

As illustrated in FIG. 3, when the current flowing through the conductive wire 10 is I (A) and the interval between the conductive wire 10 and the magnetic field measurement device 11 is r (m), the magnetic field intensity H (A/m) generated by the current I flowing through the conductive wire 10 can be expressed by the following expression.

$H=I/2\pi r$

As shown in FIG. 4, under the state in which the counterweight 3 is not disengaged from the counterweight guide rail 5, specifically, under a normal state, the interval r between the conductive wire 10 and the magnetic field measurement device 11 becomes equal to the set interval R. Specifically, when the current I flowing through the conductive wire 10 is regulated to be $I_0$, the magnetic field intensity H becomes equal to $I_0/2\pi R$.

Further, under the state in which the counterweight 3 is disengaged from the counterweight guide rail 5, specifically, under a derailment state, the interval r between the conductive wire 10 and the magnetic field measurement device 11 can have a value falling within a range of: $0<r<R$ or $r>R$.

In a case of occurrence of the derailment of the counterweight 3, when the magnetic field measurement device 11 provided to the counterweight 3 has moved in a direction closer to the conductive wire 10, the interval r can have a value falling within a range of: $0<r<R$. In this case, the magnetic field intensity H can have a value failing within a range of: $H>I_0/2\pi R$. Specifically, when the magnetic field intensity H measured by the magnetic field measurement device 11 is larger than $I_0/2\pi R$, it is found that the counterweight 3 is in the derailment state.

Meanwhile, in a case of occurrence of the derailment of the counterweight 3, when the magnetic field measurement device 11 provided to the counterweight 3 has moved in a direction away from the conductive wire 10, the interval r can have a value falling within a range of: $r>R$. In this case, the magnetic field intensity H can have a value falling within a range of: $0<H<I_0/2\pi R$. Specifically, when the magnetic field intensity H measured by the magnetic field measurement device 11 is smaller than $I_0/2\pi R$, it is found that the counterweight 3 is in the derailment state.

As described above, whether or not the derailment of the counterweight 3 has occurred can be determined based on a magnitude of the magnetic field intensity H. Further, a value of the current $I_0$ to be caused to flow through the conductive wire 10 and a value of the set interval R are design values, and therefore the value of $I_0/2\pi R$ described above can be obtained in advance.

Therefore, the controller 13 is configured to, when the magnetic field intensity output from the magnetic field measurement device 11 falls above or lower than the allowable range, detect the derailment of the counterweight 3. As a method of determining the allowable range, for example, the magnetic field intensity corresponding to the normal state, specifically, the value of $I_0/2\pi R$ described above is required to be obtained in advance so that the allowable range containing the obtained magnetic field intensity is determined with a margin determined based on the obtained magnetic field intensity as a reference.

Further, as shown in FIG. 4, when I is equal to zero, H becomes zero. Specifically, when the current is not flowing through the conductive wire 10, the magnetic field intensity output from the magnetic field measurement device 11 becomes zero. As a case where the current is not flowing through the conductive wire 10, for example, as shown in FIG. 4, a case where the conductive wire 10 is broken and a case where the DC power supply 131 is shut off are conceivable.

Therefore, the controller 13 may be configured to, when the magnetic field intensity output from the magnetic field measurement device 11 is zero, detect occurrence of an abnormality in the derailment rail detection device.

The configuration according to the first embodiment may have a fail-safe function. The term "fail-safe" herein means stopping an elevator when an abnormality occurs in the derailment detection device or when the detection of the derailment by the derailment detection device is impossible. More specifically, the derailment detection device may be configured to stop the elevator when, for example, breaking of the conductive wire 10, shut-off of the DC power supply 131 to the conductive wire 10, a failure of the DC power supply 131, breaking of a wiring extending from the magnetic field measurement device 11 to the determinator 135, a failure of the magnetic field measurement device 11, an abnormality in the detector 137, a failure of the detector 137, or an abnormality in a circuit of the controller 13 occurs.

Further, although the case where the vertically movable body being a target of detection of derailment is the counterweight 3 has been exemplified in the first embodiment, the vertically movable body being the target of detection of derailment may be the car 2. Specifically, the magnetic field measurement device 11 may be mounted to the car 2 so as to detect disengagement of the car 2 from at least one of the car guide rails 4. Further, the present invention is applicable not only to the type of elevator apparatus illustrated in FIG. 1 but also to various types of elevator apparatus.

As described above, according to the first embodiment, the elevator derailment detection device includes: the conductive wire, which is provided in the hoistway in parallel to the direction in which the vertically movable body is to be raised and lowered; the magnetic field measurement device, which is provided to the vertically movable body so as to measure the intensity of the magnetic field generated by the current flowing through the conductive wire, and is configured to output the measured magnetic field intensity, and the controller configured to detect the disengagement of the vertically movable body from the at least one of the guide rails when the magnetic field intensity output from the magnetic field measurement device falls above or lower than the allowable range.

The above-mentioned configuration enables the improvement of stability in detection of the derailment of the vertically movable body as compared to the related-art configurations for detecting the derailment of the vertically movable body based on contact between the conductive wire and the contact element.

The invention claimed is:

1. An elevator derailment detection device, which is configured to detect disengagement of a vertically movable body, which is to be guided by guide rails to be raised and lowered, from at least one of the guide rails; the elevator derailment detection device comprising:
   a conductive wire provided in a hoist way in parallel to a direction in which the vertically movable body is to be raised and lowered;
   a magnetic field measurement device, which is provided to the vertically movable body so as to measure an intensity of a magnetic field generated by a current flowing through the conductive wire, and is configured to output the measured magnetic field intensity; and
   a controller configured to detect the disengagement of the vertically movable body from the at least one of the guide rails in response to, the magnetic field intensity output from the magnetic field measurement device falling above or lower than an allowable range.

2. The elevator derailment detection device according to claim 1, further comprising a noise attenuator configured to attenuate noise superimposed on the magnetic field intensity output from the magnetic field measurement device.

3. The elevator derailment detection device according to claim 1, wherein the controller includes:
   a determinator configured to determine whether the magnetic field intensity falls within the allowable range;
   a detector configured to detect the disengagement of the vertically movable body from the at least one of the guide rails; and
   a normal-signal output device configured to output a normal signal to the detector,
   wherein the determinator is configured to interrupt input of the normal signal from the normal-signal output device to the detector in response to the magnetic field intensity falling above or lower than the allowable range, and
   wherein the detector is configured to detect the disengagement of the vertically movable body from the at least one of the guide rails in response to the input of the normal signal from the normal-signal output device being interrupted.

4. The elevator derailment detection device according to claim 1, wherein the controller is configured to detect occurrence of an abnormality in the elevator derailment detection device in response to the magnetic field intensity output from the magnetic field measurement device being zero.

5. The elevator derailment detection device according to claim 2, wherein the controller includes:
   a determinator configured to determine whether the magnetic field intensity falls within the allowable range;
   a detector configured to detect the disengagement of the vertically movable body from the at least one of the guide rails; and
   a normal-signal output device configured to output a normal signal to the detector,
   wherein the determinator is configured to interrupt input of the normal signal from the normal-signal output device to the detector in response to the magnetic field intensity falling above or lower than the allowable range, and
   wherein the detector is configured to detect the disengagement of the vertically movable body from the at least one of the guide rails in response to the input of the normal signal from the normal-signal output device being interrupted.

6. The elevator derailment detection device according to claim 2, wherein the controller is configured to detect occurrence of an abnormality in the elevator derailment detection device in response to the magnetic field intensity output from the magnetic field measurement device being zero.

7. The elevator derailment detection device according to claim 3, wherein the controller is configured to detect occurrence of an abnormality in the elevator derailment detection device in response to the magnetic field intensity output from the magnetic field measurement device being zero.

* * * * *